(12) United States Patent
Ma (10) Patent No.: US 9,637,087 B2
(45) Date of Patent: May 2, 2017

(54) CONTROL SYSTEM

(75) Inventor: Zikang Ma, Rochester Hills, MI (US)

(73) Assignee: Brose Fahrzeugteile GmbH & Co. KG, Hallstadt, Hallstadt (DE)

(*) Notice: Subject to any disclaimer, the term of this patent is extended or adjusted under 35 U.S.C. 154(b) by 192 days.

(21) Appl. No.: 14/343,005

(22) PCT Filed: Aug. 24, 2012

(86) PCT No.: PCT/EP2012/003577
§ 371 (c)(1),
(2), (4) Date: Jul. 7, 2014

(87) PCT Pub. No.: WO2013/034252
PCT Pub. Date: Mar. 14, 2013

(65) Prior Publication Data
US 2015/0019085 A1    Jan. 15, 2015

(30) Foreign Application Priority Data
Sep. 5, 2011 (DE) .......................... 10 2011 112 274

(51) Int. Cl.
*B60J 5/00* (2006.01)
*B60R 25/20* (2013.01)
(Continued)

(52) U.S. Cl.
CPC ............. *B60R 25/2054* (2013.01); *B60J 5/00* (2013.01); *E05F 15/73* (2015.01); *G01B 7/023* (2013.01);
(Continued)

(58) Field of Classification Search
CPC .. B60N 2/0248; B60N 2/0244; B60N 2/0232; B60N 2/0252; B60Q 2300/112; E05F 155/00
See application file for complete search history.

(56) References Cited

U.S. PATENT DOCUMENTS 5,844,486 A    12/1998  Barron et al.
6,275,146 B1   8/2001   Kithil et al.
(Continued)

FOREIGN PATENT DOCUMENTS

DE    10235925    2/2004
DE    10254708    6/2004
(Continued)

OTHER PUBLICATIONS

WO2011092206_machine translation, Wagenhuber, published Aug. 4, 2011.*
(Continued)

*Primary Examiner* — Jelani Smith
(74) *Attorney, Agent, or Firm* — Pauly, Devries Smith & Deffner, LLC (57) ABSTRACT

The invention relates to a control system for driving a motorized closure element of a motor vehicle, wherein a control arrangement and at least one distance sensor are provided in order to detect operator control events, wherein a distance from a user can be detected by means of the distance sensor. The invention proposes that the distance sensor has a changing sensitivity along a sensor extent, and in that a longitudinal movement by the user along the sensor extent produces a pattern in the profile of the sensor signal with respect to time, which pattern is detected by the control arrangement at least as part of an operator control event, owing to the sensitivity profile along the sensor extent.

20 Claims, 3 Drawing Sheets

(51) Int. Cl.
*G01S 13/93* (2006.01)
*G01B 7/02* (2006.01)
*E05F 15/73* (2015.01)
*G07C 9/00* (2006.01)

(52) U.S. Cl.
CPC ....... *G01S 13/931* (2013.01); *E05Y 2400/852* (2013.01); *E05Y 2400/858* (2013.01); *E05Y 2900/546* (2013.01); *G01S 2013/9378* (2013.01); *G01S 2013/9389* (2013.01); *G07C 9/00126* (2013.01)

(56) References Cited

U.S. PATENT DOCUMENTS

| | | | |
|---|---|---|---|
| 6,478,357 | B2 | 11/2002 | Zhou |
| 7,880,481 | B2 | 2/2011 | Zangl et al. |
| 8,027,769 | B2 | 9/2011 | Zander et al. |
| 8,225,458 | B1 | 7/2012 | Hoffberg et al. |
| 8,284,022 | B2 | 10/2012 | Kachouh |
| 8,606,467 | B2 | 12/2013 | Gehin |
| 8,788,152 | B2 | 7/2014 | Reimann et al. |
| 9,081,032 | B2 | 7/2015 | Lange |
| 9,283,994 | B2 | 3/2016 | Holzberg et al. |
| 9,290,982 | B2 | 3/2016 | Schuetz et al. |
| 2002/0030666 | A1 | 3/2002 | Philipp et al. |
| 2002/0143452 | A1 | 10/2002 | Losey et al. |
| 2004/0085079 | A1 | 5/2004 | Lin et al. |
| 2004/0178924 | A1* | 9/2004 | Gifford ............... H03K 17/955 340/870.07 |
| 2005/0231194 | A1 | 10/2005 | Baldi et al. |
| 2006/0267374 | A1 | 11/2006 | Jackson et al. |
| 2006/0293800 | A1 | 12/2006 | Bauer et al. |
| 2007/0072154 | A1 | 3/2007 | Akatsuka et al. |
| 2008/0068145 | A1 | 3/2008 | Weghaus et al. |
| 2008/0088188 | A1 | 4/2008 | Busch et al. |
| 2008/0195273 | A1 | 8/2008 | Matsuura et al. |
| 2008/0303685 | A1 | 12/2008 | Nakano et al. |
| 2009/0222174 | A1 | 9/2009 | Frommer et al. |
| 2009/0243826 | A1 | 10/2009 | Touge |
| 2010/0256875 | A1 | 10/2010 | Gehin et al. |
| 2011/0118946 | A1* | 5/2011 | Reimann ............ B60R 25/2036 701/49 |
| 2011/0234370 | A1 | 9/2011 | Briese et al. |
| 2011/0276234 | A1 | 11/2011 | Van Gastel |
| 2011/0313619 | A1* | 12/2011 | Washeleski ............ E05F 15/40 701/36 |
| 2012/0188078 | A1 | 7/2012 | Soles et al. |
| 2012/0290177 | A1* | 11/2012 | Wagenhuber ....... B60R 25/2045 701/49 |
| 2013/0234733 | A1 | 9/2013 | Lange et al. |
| 2013/0234828 | A1 | 9/2013 | Holzberg et al. |
| 2013/0311039 | A1 | 11/2013 | Washeleski et al. |
| 2014/0032055 | A1 | 1/2014 | Holzberg et al. |
| 2014/0195073 | A1 | 7/2014 | Herthan |
| 2014/0285217 | A1 | 9/2014 | Van Gastel et al. |
| 2014/0324273 | A1 | 10/2014 | Russ et al. |
| 2014/0373447 | A1 | 12/2014 | Gunreben et al. |
| 2015/0128497 | A1 | 5/2015 | Schuetz et al. |
| 2015/0134208 | A1 | 5/2015 | Gunreben |
| 2015/0176322 | A1 | 6/2015 | Wuerstlein et al. |
| 2015/0176323 | A1 | 6/2015 | Ebert |
| 2015/0176324 | A1* | 6/2015 | Ebert ..................... E05F 15/73 701/49 |
| 2015/0233167 | A1 | 8/2015 | Natsui |
| 2015/0258879 | A1 | 9/2015 | Mandzak |
| 2015/0345205 | A1 | 12/2015 | Gunreben et al. |

FOREIGN PATENT DOCUMENTS

| | | | |
|---|---|---|---|
| DE | 102004055982 | 6/2006 | |
| DE | 102004057220 | 6/2006 | |
| DE | 102005042402 | 3/2007 | |
| DE | 102005055002 | 5/2007 | |
| DE | 202005020140 | 6/2007 | |
| DE | 10158533 | 2/2009 | |
| DE | 102009004384 | 7/2009 | |
| DE | 102008041354 | 2/2010 | |
| DE | 102009041555 | 6/2010 | |
| DE | WO 2010076332 A1 * | 7/2010 | ............. E05B 81/78 |
| DE | 102009047066 | 5/2011 | |
| DE | 102009055778 | 6/2011 | |
| DE | 102010048144 | 7/2011 | |
| DE | 102010006213 | 8/2011 | |
| DE | WO 2011092206 A1 * | 8/2011 | ......... B60R 25/2045 |
| DE | 102010002559 | 9/2011 | |
| DE | 102011112274 | 3/2013 | |
| DE | 102012013065 | 1/2014 | |
| DE | 102013114881 | 6/2015 | |
| EP | 0711977 | 5/1996 | |
| EP | 1422366 | 5/2004 | |
| FR | 2943190 | 9/2010 | |
| GB | 2376075 | 12/2002 | |
| JP | 02055168 | 2/1990 | |
| JP | 06018547 | 1/1994 | |
| JP | 2007228640 | 9/2007 | |
| JP | 2009079353 | 4/2009 | |
| JP | 2010236184 | 10/2010 | |
| WO | 2005084979 | 9/2005 | |
| WO | 2007/006514 | 1/2007 | |
| WO | 2012052210 | 4/2012 | |
| WO | 2012/084111 | 6/2012 | |
| WO | 2013034252 | 3/2013 | |
| WO | 2013091839 | 6/2013 | |

OTHER PUBLICATIONS

WO2010076332_machine translation, Van Gastel, published Jul. 8, 2010.*
"German Search Report," for DE Application No. 102011112274.9 corresponding to U.S. Appl. No. 14/343,005, mailed May 9, 2012 (4 pages).
"International Search Report," for application No. PCT/EP2013/066998 corresponding to U.S. Appl. No. 14/343,005, mailed Oct. 26, 2012 (6 pages).
Brose Fahrzeugteile Gmbh & CO.KG, "Sesam oeffne Dich. In: AutomobilKONSTRUKTION," Feb. 2012 (pp. 50-51), with English translation (4 pages).
European Search Report for EP Application No. 13713812.2 corresponding to U.S. Appl. No. 13/951,163 dated Oct. 31, 2013 (3 pages).
German Search Report for German Patent Application No. 102013114883.2, mailed on Feb. 4, 2014 (5 pages).
International Search Report and Written Opinion for PCT/EP2013/063905 related to U.S. Appl. No. 14/412,511, mailed Aug. 1, 2013 (8 pages) [English Translation].
International Search Report for PCT/EP2012/005234 related to U.S. Appl. No. 14/367,786, mailed Jun. 14, 2013 (3 pages).
International Written Opinion for PCT/EP2012/005234 related to U.S. Appl. No. 14/367,786, completed Jun. 7, 2014 (10 pages).
Non Final Office Action for U.S. Appl. No. 13/951,163, mailed on Dec. 17, 2014 (31 pages).
Non-Final Office Action for U.S. Appl. No. 14/412,511, mailed Apr. 11, 2016 (20 pages).
Non-Final Office Action for U.S. Appl. No. 14/581,441, mailed Jun. 3, 2016 (10 pages).
Notice of Allowance for U.S. Appl. No. 13/951,163, mailed Nov. 6, 2015 (13 pages).
Office Action for KR Patent Application No. 10-2013-0087175 corresponding to U.S. Appl. No. 13/951,163 completed Jan. 21, 2015 (13 pages).
Search Report for German Application No. 102012014676.0 corresponding to U.S. Appl. No. 13/951,163, mailed Jan. 18, 2013 (5 pages).
Search Report for German Patent Application No. 102012013065.1 related to U.S. Appl. No. 14/412,511, mailed Jun. 28, 2013 (5 pages).

(56) References Cited

OTHER PUBLICATIONS

Non Final Office Action for U.S. Appl. No. 14/367,786 mailed Feb. 1, 2016 (15 pages).

* cited by examiner

CONTROL SYSTEM

CROSS-REFERENCE TO RELATED APPLICATIONS

This application is a national stage application under 35 U.S.C. 371 of International Patent Application Serial No. PCT/EP2012/003577, filed Aug. 24, 2012, which claims priority from German Patent Application No. DE 10 2011 112 274.9, filed Sep. 5, 2011, the disclosures of which are hereby incorporated by reference herein in their entirety.

FIELD OF THE INVENTION

The invention relates to a control system for driving a motorized closure element of a motor vehicle, to a motor vehicle comprising a control system and also to a method for the operation of a control system.

BACKGROUND

Modern motor vehicles are increasingly being equipped with motor-operated closure elements. Said closure elements may be, for example, doors, in particular sliding doors, hatches, in particular tailgates, trunk lids, engine hoods, cargo space floors or the like of a motor vehicle. In this respect, the term "closure element" has a broad meaning in the present case.

One convenience function which is becoming increasingly important today is the automatic operation of the motorized tailgate of a motor vehicle. In the case of the known control system (DE 20 2005 020 140 U1) on which the invention is based, provision is made for an operator control event which is performed by the operator, in this case a foot movement which is performed by the operator, to prompt motorized opening of the tailgate.

A drive arrangement which is associated with the tailgate, a control arrangement and also a distance sensor are provided for this purpose. The control arrangement monitors the sensor signals in order to check whether the above operator control event is occurring. The drive arrangement is accordingly driven depending on the result of this operator control event monitoring operation.

Capacitive distance sensors which are equipped with at least one measurement electrode can be used in order to detect the above operator control events. In this case, an operator control event triggers a change in capacitance of the electrode arrangement, it being possible for this change in capacitance to be easily detected in an electronic manner. A measurement electrode of this kind is generally integrated into the rear skirt of a motor vehicle and extends over the entire width of the motor vehicle. Although a distance sensor of this kind is of robust and structurally simple design, the possible functional scope of the distance sensor is by no means exhausted.

The invention is based on the problem of configuring and developing the known control system in such a way that the existing components can be better utilized for detecting an operator control event.

SUMMARY

It is important to know that a distance sensor, which extends in at least one direction in space—sensor extent—can be used not only for detecting a distance from a user in a measurement direction which is oriented perpendicular to the sensor extent. The proposed solution is based on knowing that a distance sensor of this kind can also be used to detect a longitudinal movement of the user along the sensor extent, provided that the distance sensor is designed in a specific manner.

Specifically, the invention proposes that the distance sensor has a changing sensitivity along a sensor extent. In this case, the term "sensitivity" is to be understood in the broadest sense in such a way that a change in the sensitivity given the same distance from the user always results in a corresponding change in the sensor signal.

The term "changing sensitivity" further means that the sensitivity in the above sense changes at a point along the sensor extent in any case. Therefore, in principle, the sensitivity can be constant, or even zero, at least at points. In the last-mentioned case, the distance sensor does not react to the approach of a user.

With the proposed solution, detection by sensors is not limited to the lateral movements by the user transverse to the sensor extent which involve a change in distance from the user. Owing to the proposed sensitivity profile, a longitudinal movement by the user can now be detected too, said longitudinal movement by the user generating a corresponding pattern in the profile of the sensor signal with respect to time. It should be particularly noted here that the additional detection of the longitudinal movement by the user requires only modification of a distance sensor, and not an additional sensor.

The distance sensor can be equipped with a sensor element which, in an embodiment, is an elongate measurement electrode. In the simplest case, the measurement electrode is a single electrical conductor. A capacitive or an inductive sensor can be constructed in an extremely simple manner in this case.

In an embodiment, the sensitivity profile along the sensor extent has at least one maximum and/or at least one minimum. Suitable, in particular asymmetrical, distribution of the maxima and/or minima over the sensor extent can ensure that a pattern which can be easily extracted as a whole from the profile of the sensor signal with respect to time is produced in the event of a longitudinal movement by the user.

According to an embodiment, a motor vehicle comprising a motorized closure element, in particular comprising a motorized tailgate or the like, is claimed, said motor vehicle being equipped with an above proposed control system. Reference may be made to all embodiments which are suitable for describing the proposed motor vehicle.

In an embodiment, the distance sensor is arranged in a rear skirt of the motor vehicle, wherein the maxima and/or minima are arranged in the sensitivity profile such that it is possible to distinguish between the first half of the rear skirt and a second half of the rear skirt. Given a suitable design, it is possible to detect the movement direction and a first position of the user along the sensor extent in the event of a longitudinal movement by the user as a result.

A method for the operation of a proposed control system is described herein.

According to this further teaching, it is essential that a longitudinal movement by a user along the sensor extent of the distance sensor produces a pattern in the profile of the sensor signal with respect to time, which pattern is detected by the control arrangement at least as part of an operator control event, owing to the sensitivity profile along the sensor extent. In this respect, reference may be made to all of the statements made in relation to the proposed control system.

In an embodiment, provision is made for the operator control event which is to be detected to involve both a lateral movement by the user substantially perpendicular to the sensor extent and also a longitudinal movement by the user along the sensor extent. In the case of a combined detection operation of this kind, the advantages of the proposed solution are fully exhausted.

In an embodiment the invention provides a control system for driving a motorized closure element of a motor vehicle, wherein a control arrangement and at least one distance sensor are provided in order to detect operator control events, wherein a distance from a user can be detected by means of the distance sensor, wherein the distance sensor has a changing sensitivity along a sensor extent, and in that a longitudinal movement by the user along the sensor extent produces a pattern in the profile of the sensor signal with respect to time, which pattern is detected by the control arrangement at least as part of an operator control event, owing to the sensitivity profile along the sensor extent.

In an embodiment, the sensor extent of the distance sensor runs in a straight line at least in sections, and/or in that the sensor extent runs with a bend at least in sections.

In an embodiment, the distance sensor has a sensor element which is arranged along the sensor extent of the distance sensor, such as the sensor element is oriented parallel to the sensor extent, such as in a straight line, at least in sections, and/or in that the sensor element deviates from the parallel orientation at least in sections in order to influence the sensitivity, such as the sensor element runs in the form of a loop at least in sections in order to influence the sensitivity.

In an embodiment, the sensor element is an elongate measurement electrode which comprises at least one, such as one, electrical conductor.

In an embodiment, the sensitivity profile along the sensor extent has at least one maximum, such as at least two maxima, and/or at least one minimum, such at least two minima.

In an embodiment, the maxima and/or the minima are not arranged equidistantly in relation to one another along the sensor extent.

In an embodiment, the maxima and/or the minima are distributed in an asymmetrical manner over the sensor extent.

In an embodiment, the sensitivity profile along the sensor extent is provided in such a way that the movement direction of the user can be ascertained from the pattern in the profile of the sensor signal with respect to time, which pattern is produced in the event of a longitudinal movement by the user along the sensor extent, by means of the control arrangement.

In an embodiment, the sensitivity profile along the sensor extent is provided in such a way that a first position of the user along the sensor extent can be ascertained from the pattern in the profile of the sensor signal with respect to time, which pattern is produced in the event of a longitudinal movement by the user along the sensor extent, by means of the control arrangement.

In an embodiment, at least two detection regions are associated with the distance sensor along the sensor extent, said detection regions each having a different sensitivity profile along the sensor extent, with the result that a longitudinal movement by the user along the sensor extent into the detection regions generates different partial patterns in the profile of the sensor signal with respect to time, and in that the partial patterns are based on the sensitivity profiles within the detection regions.

In an embodiment, the invention provides for a motor vehicle comprising a motorized closure element, such as comprising a motorized tailgate, a motorized side door, a motorized sliding door or the like, characterized by a control system for driving the motorized closure element described herein.

In an embodiment, the motor vehicle has a body component, such as a front, rear or side skirt, and in that the distance sensor is arranged in or behind the body component in the fitted state, such as the distance sensor extends at least over the majority of the width of the body component, such as the front, rear or side skirt.

In an embodiment, the sensitivity profile along the sensor extent has a first number of maxima and/or minima in the first half of the rear skirt, and has a second number of maxima and/or minima in the second half of the rear skirt.

In an embodiment, the invention provides a method for the operation of a control system for driving a motorized closure element of a motor vehicle as described herein, wherein a longitudinal movement by the user along the sensor extent of the distance sensor produces a pattern in the profile of the sensor signal with respect to time, which pattern is detected by the control arrangement at least as part of an operator control event, owing to the sensitivity profile along the sensor extent.

In an embodiment, an operator control event comprises a lateral movement by the user substantially perpendicular to the sensor extent, said lateral movement generating a pattern in the profile of the sensor signal with respect to time, which pattern is based on a change in the distance from the user.

BRIEF DESCRIPTION OF THE FIGURES

The invention will be explained in greater detail below with reference to a drawing which illustrates only one exemplary embodiment. In the drawing

DETAILED DESCRIPTION

The proposed control system will be explained below with reference to a motorized closure element 1 of a motor vehicle, which closure element is designed as a tailgate.

The design of the closure element 1 can be a tailgate of a motor vehicle. However, reference may be made to the introductory part of the description in respect of the broad meaning of the term "closure element". In this respect, all of the statements made in relation to a tailgate 1 correspondingly apply for all other types of closure elements.

Figure 1:
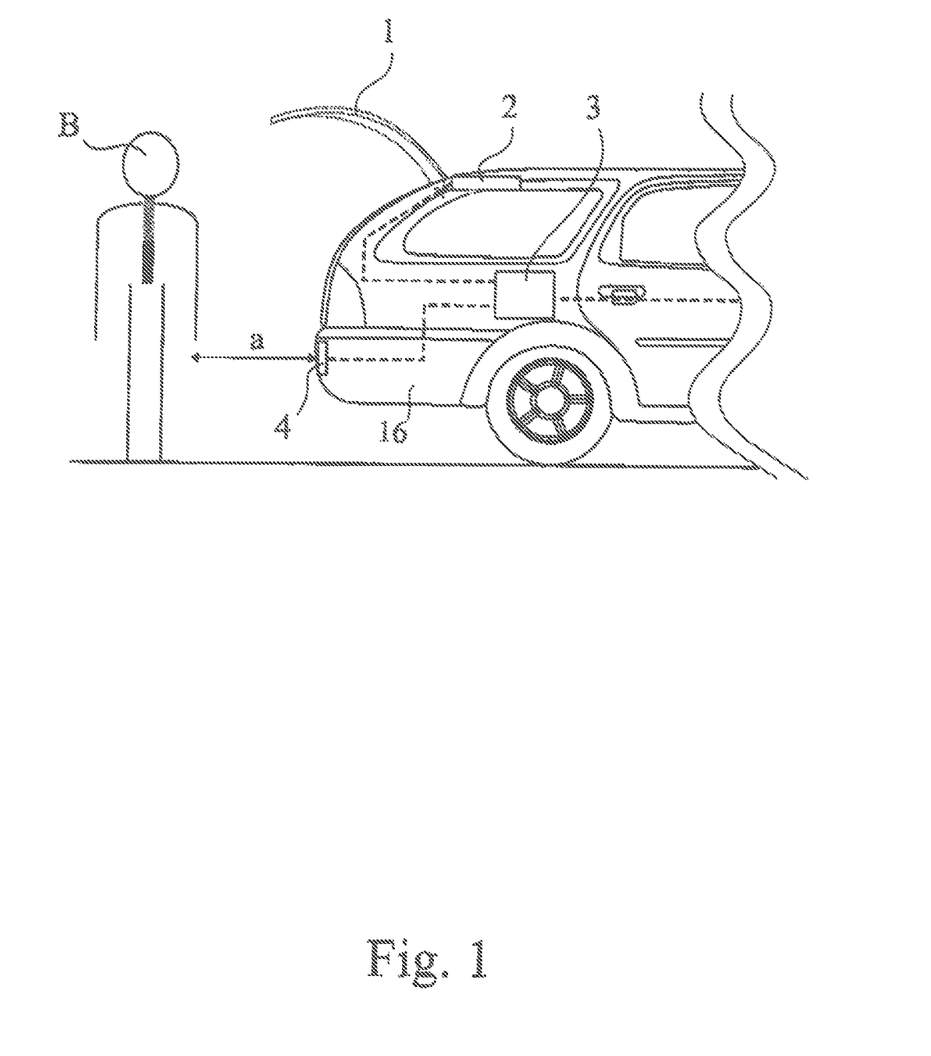
FIG. 1 shows the rear region of a motor vehicle comprising a proposed control system for carrying out the proposed method.

The tailgate 1 has an associated drive arrangement 2 by means of which the tailgate 1 can be adjusted in a motorized manner between the closed position, which is illustrated using solid lines in FIG. 1, and the open position, which is illustrated using dashed lines in FIG. 1.

A control arrangement 3 which serves to detect operator control events and, on the basis of these, driving of the motorized tailgate 1, is also provided. In order to detect the operator control events, the control arrangement 3 communicates with at least one distance sensor 4, wherein a distance a between the distance sensor 4 and a user B can be detected by means of the distance sensor 4. In this case, the distance from the user B comprises the distance from the user overall or from a limb, in particular a leg, a foot, an arm or a hand, of the user.

In principle, several distance sensors 4 can be provided in this case. Only one single distance sensor 4 is discussed in the text which follows for the purpose of clear illustration. All embodiments in this respect correspondingly apply to further distance sensors 4 which may be provided.

Detection of an above operator control event can lead to motorized operation of the tailgate 1, in particular to motorized opening or closing or to interruption of an opening or closing movement.

It is now important for the distance sensor 4 to have a changing sensitivity 6 along a sensor extent 5. Reference may be made to the statements made in the general part of the description in respect of the broader meaning of the term "sensitivity". In this case, the sensor extent 5 is oriented perpendicular to the longitudinal axis of the vehicle, but this should not be understood in a limiting sense.

The sensitivity profile S is schematically illustrated over a distance d along the sensor extent 5 in FIGS. 2a) and 3a).

If a user B or a body part of the user B, for example a leg of the user B, moves along the sensor extent 5, said user or body part passes the maxima, which are illustrated in FIGS. 2a) and 3a) and are still to be explained, in the sensitivity profile S, this leading to the profiles of the sensor signals with respect to time according to FIGS. 2b) and 3b). An extractable pattern 8, 9 in the profile of the sensor signal with respect to time, which pattern is detected by the control arrangement 3 in this case at least as part of an operator control event, is produced owing to the sensitivity profile S along the sensor extent 5. The fact that the different directions of movement by the user B or by the body part of the user B can be detected on account of the disparity in the patterns in the sensor signal profile 8, 9 as shown in FIGS. 2b) and 3b) is of interest and will be explained below.

In this case, the distance sensor 4 runs substantially in a straight line along the sensor extent 5. This can also be provided in this way only in sections. As an alternative or in addition, provision can be made for the sensor extent 5 to run with a bend at least in sections. Finally, it is feasible for the distance sensor 4 to extend in two directions in space. In this case, the distance sensor 4 spans a plane. All of the statements made in relation to the illustrated distance sensor 4 can be correspondingly applied to a distance sensor which extends in two directions in space.

The illustrations according to FIG. 2a) and FIG. 3a) show that the distance sensor 4 has a sensor element 10 which is arranged along the sensor extent 5 of the distance sensor 4. In this case, a single sensor element 10 is provided, it being possible for said sensor element to be designed in a manner which will be explained below.

In the illustrated and, in this respect, an embodiment, the sensor element 10 is oriented parallel to the sensor extent 5, in particular in a straight line, in sections. In addition, in this case, provision is made for the sensor element 10 to deviate from the parallel orientation, and to run in the manner of a loop, for example, in sections in order to influence the sensitivity.

In this case, the distance sensor 4 is a capacitive sensor. However, the use of an inductive sensor may also be advantageous. In general, it is also possible to use other sensor principles. It is feasible, for example, for the distance sensor 4 to be a magnetic sensor.

The sensor element 10 can be an elongate measurement electrode which is illustrated in FIGS. 2a) and 3a) and comprises at least one, in this case one, electrical conductor.

The above loop-like design leads to the sensitivity of the capacitive distance sensor 4 being influenced. Any desired local formations of the measurement electrode are feasible in order to influence the sensitivity. Said formations include, for example, meandering formations or the like.

The illustrations according to FIGS. 2a) and 3a) also show that the sensitivity profile S along the sensor extent 5 has a series of maxima M which are each based on one of the loop-like designs in the sensor element 10. As an alternative or in addition, provision can be made for corresponding minima to be provided in the sensitivity profile S. In an embodiment, at least two maxima or at least two minima are realized in order to be able to generate an above pattern in the profile of the sensor signal with respect to time.

If at least three maxima and/or minima are provided, it is proposed that the maxima and/or the minima are not arranged equidistantly in relation to one another along the sensor extent 5.

It is further proposed that the maxima and/or the minima are distributed in an asymmetrical manner over the sensor extent 5.

The above variants for designing the sensor element 10 mean that a pattern 8, 9 is produced in the profile of the sensor signal with respect to time, which profile can be easily extracted from the rest of the profile of the sensor signal, in the event of a longitudinal movement by a user along the sensor extent 5, with the result that a longitudinal movement by a user can be correspondingly easily identified.

Figure 2:
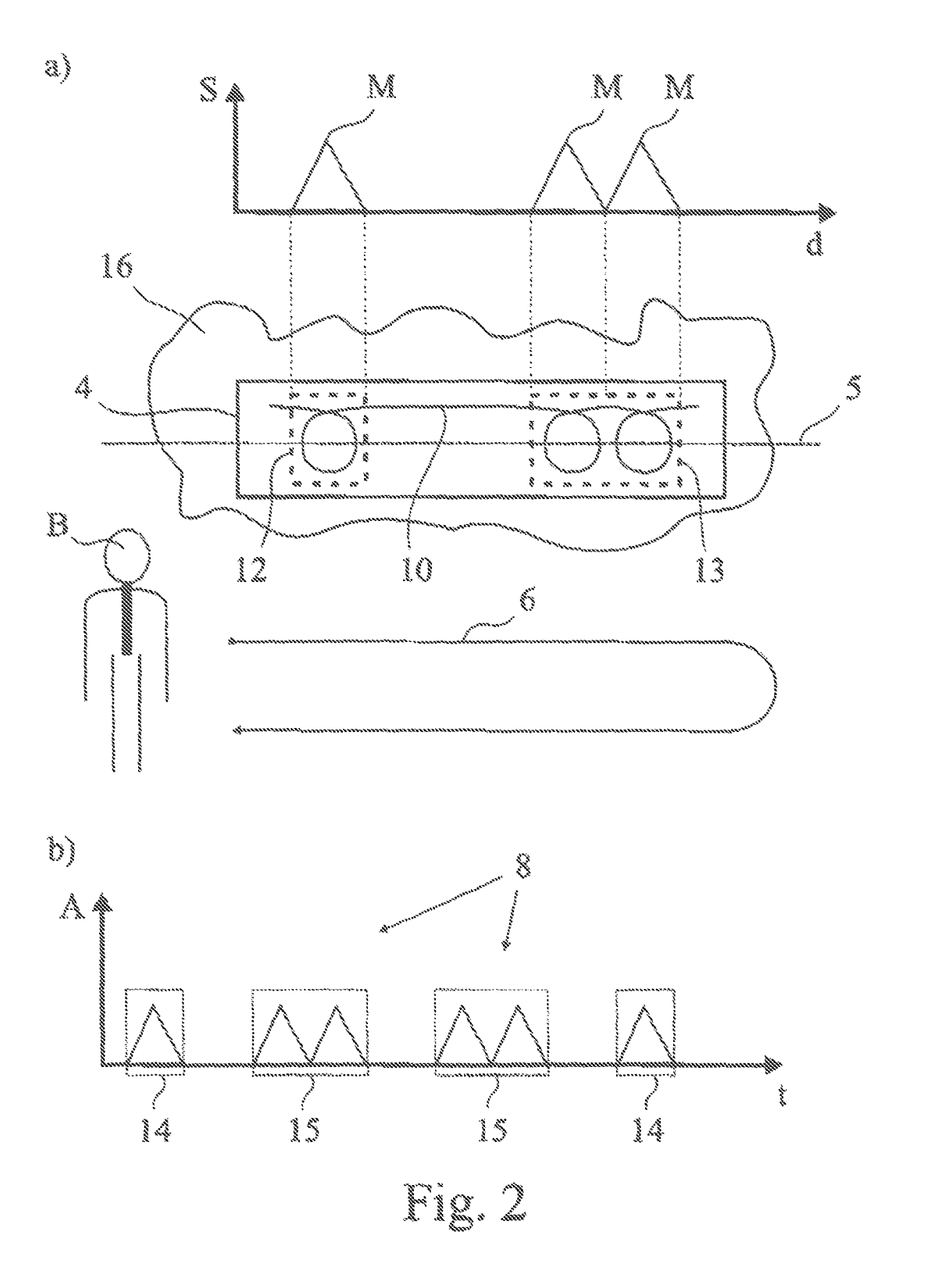
FIG. 2 shows a highly schematic illustration of the rear skirt of the rear region according to FIG. 1 in a view from the end, and also, in a merely indicated manner, a longitudinal movement by a user, and b) shows the pattern which is generated by the movement by the user according to a) in the profile of the sensor signal.
Figure 3:
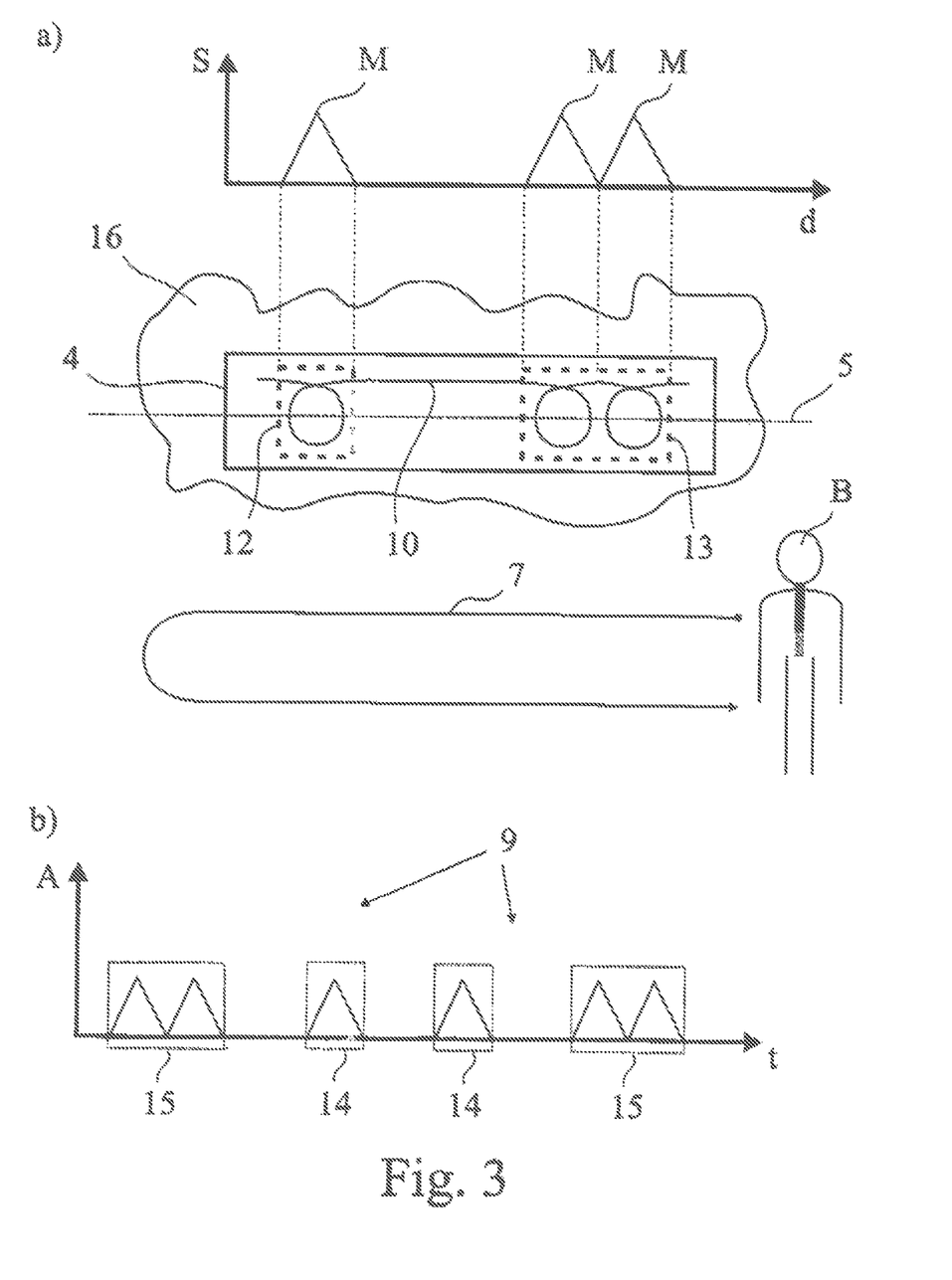
FIG. 3 shows the illustration according to FIG. 2 in the case of an opposite movement by the user.

FIGS. 2 and 3 emphasize a movement 6, 7 by a user which, according to FIGS. 2a) and 3a), involves a movement in one direction and then a return movement. In this case, this movement 6, 7 by the user is made along the rear region of the motor vehicle, as will be explained below. However, it is also feasible to detect movements by the user which are oriented substantially perpendicular to the extent of the rear region of the motor vehicle. This will also be explained further below.

The sensitivity profile S can be provided along the sensor extent 5 in such a way that the direction of movement of the user B can be ascertained from the pattern 8, 9 in the profile A of the sensor signal with respect to time, which pattern is produced in the event of a longitudinal movement by the user along the sensor extent 5, by means of the control arrangement 3.

Comparison of FIGS. 2b) and 3b) shows that the two resulting patterns 8, 9 in the profile of the sensor signal with respect to time complement one another to a certain extent, as a result of which the direction of movement of the user B can be readily detected.

However, it is also feasible for a first position of the user B along the sensor extent 5 to be ascertained from the pattern 8, 9 in the profile A of the sensor signal with respect to time, which pattern is produced in the event of a longitudinal movement by the user along the sensor extent 5, by means of the control arrangement 3.

The fact that at least two detection regions 12, 13, in this case precisely two detection regions 12, 13, are associated with the distance sensor 4 along its sensor extent 5, said detection regions each having a different sensitivity profile S along the sensor extent 5, is of interest in the illustrated embodiment. Specifically, the first detection region 12 has a single maximum M and the second detection region 13 has two maxima M which are situated next to one another.

As a result, a longitudinal movement by the user along the sensor extent 5 into the detection regions 12, 13 generates different partial patterns 14, 15, as are shown in FIGS. 2b) and 3b). Said partial patterns 14, 15 are based on the sensitivity profiles S within the detection regions 12, 13, with the result that the partial pattern 14 which is associated with the first detection region 12 has a single maximum, and the partial pattern 15 which is associated with the second detection region 13 has a double maximum. If a single maximum is coded "1" and a double maximum is coded "2" in the profile A of the sensor signal, the sensor profile which is illustrated in FIG. 2b) exhibits the number sequence "1, 2, 2, 1", whereas the profile of the sensor signal which is illustrated in FIG. 3b) exhibits the number sequence "2, 1, 1, 2". It is easy to establish the movement direction of the movement which has been carried out by the user in this way.

The illustrated motor vehicle is equipped with a body component 16, it being possible for said body component to be, for example, a front, rear or side skirt. The distance sensor 4 is arranged in or behind the body component 16 in the fitted state. In the case of the body component 6 which is illustrated here and is designed as a rear skirt, the distance sensor 4 can extend at least over the majority of the width of the rear skirt 16.

In principle, provision can be made for the distance sensor 4 to also extend perpendicular to the body component 16, in this case to the rear skirt 16. In this case, a foot movement, which is performed perpendicular to the extent of the rear skirt 16 and below the rear skirt 16, for example leads to a pattern 8, 9 in the profile A of the sensor signal, which pattern is based on the sensitivity profile S. Other variants for the extent of the distance sensor 4 are feasible.

However, primarily, the foot movement is based on a change in distance being determined by the distance sensor 4, and a longitudinal movement by the user along the sensor extent 5 being detected by the pattern 8, 9 in the profile A of the sensor signal which is based on the change in sensitivity. To this end, provision can be made for the sensitivity profile S along the sensor extent 5 to have a first number of maxima M and/or minima in the first half of the rear skirt 16, and to have a second number of maxima M and/or minima in the second half of the rear skirt 16. In the illustrated embodiment, a single maximum M is provided in the left-hand half of the rear skirt 16, whereas two maxima M are provided in the right-hand half of the rear skirt 16.

According to a further teaching, which has independent significance, a motor vehicle is claimed which is equipped with a motorized closure element 1, in particular with a motorized tailgate 1, a motorized side door, a motorized sliding door or the like. It is important that a proposed control system for driving the motorized closure element 1 is provided. Reference may be made to the above statements in relation to the proposed control system in respect of embodiments.

According to a further teaching, which likewise has independent significance, a method for the operation of the proposed control system is claimed. In the method, it is essential that a longitudinal movement by the user along the sensor extent 5 of the distance sensor 4 produces a pattern 8, 9 in the profile A of the sensor signal with respect to time, which pattern is detected by the control arrangement 5 at least as part of an operator control event, owing to the sensitivity profile S along the sensor extent 5. It was explained further above that, in particular, dividing the sensor detection region into two detection regions 12, 13 allows a pattern in the profile of the sensor signal, which pattern is based on the sensitivity profile S, to be extracted in a simple manner. An above part of an operator control event can be detected using simple control-related means in this way.

In an embodiment, an operator control event comprises a lateral movement by the user substantially perpendicular to the sensor extent 5. This lateral movement by the user generates a pattern in the profile of the sensor signal over time, which pattern is based on a change in the distance of the distance sensor 4 from the user.

In an embodiment, an operator control event comprises both the above lateral movement by the user and also the above longitudinal movement by the user. The lateral movement by the user may be, for example, a foot movement which comprises a movement in one direction and a return movement perpendicular to the extent of the rear skirt 16 of the motor vehicle. The longitudinal movement by the user may be a forward movement of the user B along the rear skirt 16 of the motor vehicle, so that the user B moves out of the region in which he would collide with the tailgate 1 or the like. Therefore, a motorized movement of the tailgate 1 is triggered only when the user has executed the predetermined lateral movement and has then moved laterally out of the region in which he would collide with the tailgate 1.

As explained above, the proposed solution can be used for all types of closure elements. In addition, all types of user movements can be detected using the proposed solution. Said user movements include, in addition to the forward movement of the user, the movement of the limbs of the user.

To conclude, it should be noted, merely for clarification, that all of the abovementioned user movements can each comprise not only a movement of the user B overall, but also a movement of individual body parts of the user B.

The invention claimed is:

1. A control system for driving a motorized closure element of a motor vehicle, wherein a control arrangement and at least one distance sensor are provided in order to detect operator control events, wherein a distance from a user can be detected by means of the distance sensor,
   wherein the distance sensor has a changing sensitivity along a sensor extent, and in that a longitudinal movement by the user along the sensor extent, produces a pattern in a profile of a sensor signal with respect to time, which pattern is detected by the control arrangement at least as part of an operator control event, owing to a sensitivity profile along the sensor extent.

2. The control system as claimed in claim 1, wherein the sensor extent of the distance sensor runs in a straight line at least in sections, and/or in that the sensor extent runs with a bend at least in sections.

3. The control system as claimed in claim 1 wherein the distance sensor has a sensor element which is arranged along the sensor extent of the distance sensor.

4. The control system as claimed in claim 1, wherein the sensor element is an elongate measurement electrode which comprises at least one electrical conductor.

5. The control system as claimed in claim 1, wherein the sensitivity profile along the sensor extent has at least one maximum and/or at least one minimum.

6. The control system as claimed in claim 5, wherein the maximum and/or the minimum are not arranged equidistantly in relation to one another along the sensor extent.

7. The control system as claimed in claim 5 wherein the maximum and/or the minimum are distributed in an asymmetrical manner over the sensor extent.

8. The control system as claimed in claim 1, wherein the sensitivity profile along the sensor extent is provided in such a way that a movement direction of the user can be ascertained from the pattern in the profile of the sensor signal with respect to time, which pattern is produced in an event of a longitudinal movement by the user along the sensor extent, by means of the control arrangement.

9. The control system as claimed in claim 1, wherein the sensitivity profile along the sensor extent is provided in such a way that a first position of the user along the sensor extent can be ascertained from the pattern in the profile of the sensor signal with respect to time, which pattern is produced in the event of a longitudinal movement by the user along the sensor extent, by means of the control arrangement.

10. The control system as claimed in claim 1, wherein at least two detection regions are associated with the distance sensor along the sensor extent, said detection regions each having a different sensitivity profile along the sensor extent, with the result that a longitudinal movement by the user along the sensor extent into the detection regions generates different partial patterns in the profile of the sensor signal with respect to time, and in that the partial patterns are based on the sensitivity profiles within the detection regions.

11. A motor vehicle comprising a motorized closure element characterized by a control system for driving the motorized closure element as claimed in claim 1.

12. The motor vehicle as claimed in claim 11, wherein the motor vehicle has a body component, and wherein the distance sensor is arranged in or behind a body component in a fitted state.

13. The motor vehicle as claimed in claim 12, wherein the sensitivity profile along the sensor extent has a first number of maximum and/or minimum in a first half of a rear skirt, and has a second number of maximum and/or minimum in a second half of the rear skirt.

14. A method for the operation of a control system for driving a motorized closure element of a motor vehicle as claimed in claim 1, wherein a longitudinal movement by the user along the sensor extent of the distance sensor produces a pattern in the profile of the sensor signal with respect to time, which pattern is detected by the control arrangement at least as part of an operator control event, owing to the sensitivity profile along the sensor extent.

15. The method as claimed in claim 14, wherein an operator control event comprises a lateral movement by the user substantially perpendicular to the sensor extent, said lateral movement generating a pattern in the profile of the sensor signal with respect to time, which pattern is based on a change in the distance from the user.

16. The control system as claimed in claim 3 wherein the sensor element is oriented parallel to the sensor extent.

17. The control system as claimed in claim 3, wherein the sensor element runs in a form of a loop at least in sections in order to influence the sensitivity.

18. The control system as claimed in claim 5, wherein the sensitivity profile along the sensor extent has at least two maximum and/or at least two minimum.

19. The motor vehicle as claimed in claim 11, wherein the motorized closure element comprises a motorized tailgate, a motorized side door, a motorized sliding door or the like.

20. The motor vehicle as claimed in claim 12, wherein the distance sensor extends at least over a majority of a width of the body component.

* * * * *